United States Patent [19]
Hoge et al.

[11] Patent Number: 5,232,180
[45] Date of Patent: Aug. 3, 1993

[54] MAGNETIC TAPE CARTRIDGE HAVING LEADER BLOCK LATCH MECHANISM

[75] Inventors: David T. Hoge; John C. Owens, both of Arvada, Colo.; George P. Rambosek, Shafer, Minn.

[73] Assignees: Minnesota Mining and Manufacturing Company, St. Paul, Minn.; Storage Technology Corporation, Louisville, Colo.

[21] Appl. No.: 833,317

[22] Filed: Feb. 10, 1992

[51] Int. Cl.[5] .......................... G03B 1/04; G11B 15/32
[52] U.S. Cl. .................................... 242/195; 242/197; 360/95
[58] Field of Search .................. 242/195, 197, 199; 360/93, 95, 132, 120; 226/90, 91

[56] References Cited

U.S. PATENT DOCUMENTS

| | | | |
|---|---|---|---|
| 4,383,660 | 5/1983 | Richard et al. | 360/95 |
| 4,452,406 | 6/1984 | Richard | 242/197 |
| 4,775,115 | 10/1988 | Gelardi | 242/195 |
| 4,977,474 | 12/1990 | Oishi et al. | 360/95 |

Primary Examiner—William A. Cuchlinski, Jr.
Assistant Examiner—William C. Dowling
Attorney, Agent, or Firm—Duft, Graziano & Forest

[57] ABSTRACT

The improved magnetic tape cartridge includes a leader block latch mechanism that includes an arm pivotally connected to the magnetic tape cartridge housing. A first end of the latch arm is accessible to the tape drive via an aperture in the magnetic tape cartridge housing and engagable with a feature on the leader block. The latch arm is normally in a first position where the first end of the latch arm engages a feature on the leader block to prevent its withdrawal from the magnetic tape cartridge housing. A spring biases the latch arm in the first position to maintain the leader block locked status as the preferred state. The tape drive uses a leader block latch release pin which enters the magnetic tape cartridge through an aperture in the housing to reposition the latch arm to a second position where the leader block is free to exit the magnetic tape cartridge housing.

20 Claims, 2 Drawing Sheets

MAGNETIC TAPE CARTRIDGE HAVING LEADER BLOCK LATCH MECHANISM

FIELD OF THE INVENTION

This invention relates to 3480-type magnetic tape cartridges and, in particular, to a magnetic tape cartridge having a leader block latch mechanism that functions to lock the leader block in place in the magnetic tape cartridge when the cartridge is not in use.

PROBLEM

It is a problem in the field of 3480-type magnetic tape cartridges to prevent the leader block from exiting the opening in the magnetic tape cartridge when the cartridge is not in use. The 3480-type magnetic tape cartridge is an industry standard tape cartridge that consists of a substantially rectangular housing of predetermined dimensions within which is rotatably attached a single reel of magnetic tape. One end of the magnetic tape includes a leader block that is accessible to a tape threading arm in the tape drive via an opening in one corner of the magnetic tape cartridge housing. When the magnetic tape is completely wound on the reel in the magnetic tape cartridge, the leader block is drawn into the opening of the housing a sufficient distance to block the opening. The force required to insert or retrieve the leader block from the tape cartridge opening is a function of the length of the leader block and the size of the opening in the magnetic tape cartridge. The dimensions of the leader block and the opening in the magnetic tape cartridge are variable due to the variability of the molding and assembly processes, which results in significant departures from the nominal force required to retrieve the leader block.

The existing 3480-type magnetic tape cartridges do not include a latch mechanism to prevent the withdrawal of the leader block and the attached tape from the magnetic tape cartridge. The leader block is free to move so that the tape threading arm can grasp the leader block and thread the leader block and its attached magnetic tape through the tape transport path within the tape drive. However, as the 3480-type magnetic tape cartridge is being handled by the user, or maintained in storage, or being shipped between locations, the leader block can inadvertently be extracted from the magnetic tape cartridge, thereby exposing a length of magnetic tape to damage.

SOLUTION

The above described problems are solved and a technical advance achieved in the field by the improved magnetic tape cartridge that is equipped with a leader block latch mechanism. This leader block latch mechanism provides a positive locking function that automatically mechanically secures the leader block in place in the opening of the magnetic tape cartridge housing. The leader block can not be extracted therefrom by the tape drive or by a user without releasing the latch mechanism.

The latch mechanism preferably comprises a latch arm pivotally connected within the magnetic tape cartridge housing to engage the leader block and prevent its extraction from the magnetic tape cartridge housing. A first end of the latch arm is preferably engagable with a feature on the leader block and also accessible to the tape drive via an aperture in the magnetic tape cartridge housing. The second end of the latch arm in the preferred embodiment is pivotally connected to the magnetic tape cartridge housing. The latch arm is normally in a first position where the first end of the latch arm engages a feature on the leader block to prevent its withdrawal from the magnetic tape cartridge housing. A spring preferably biases the latch arm in the first position to maintain the leader block locked status as the preferred state. The tape drive repositions the latch arm to a second position where the leader block is free to exit the magnetic tape cartridge housing. The tape drive preferably releases the leader block by the use of a leader block latch release pin on the tape drive, which latch release pin enters the magnetic tape cartridge through an aperture in the housing to reposition the latch arm from the locked to the unlocked position by overcoming the spring bias on the latch arm. This leader block latch mechanism thereby automatically locks the leader block to prevent the inadvertent withdrawal of the leader block and its attached magnetic tape from the magnetic tape cartridge during handling or shipping and is automatically unlocked by inserting the magnetic tape cartridge into the tape drive. The leader block latch mechanism also seals the latch release pin aperture when in the first position.

DETAILED DESCRIPTION

One type of computer system tape transport presently in use makes use of the IBM 3480-type magnetic tape cartridge as the data storage media. The 3480-type magnetic tape cartridge consists of a substantially rectangular exterior housing that is adapted to enclose a single reel of magnetic tape with a leader block affixed to one end of the magnetic tape. The leader block is exposed through an opening in the exterior housing of the magnetic tape cartridge for use by an associated tape drive to retrieve the magnetic tape from the magnetic tape cartridge. A tape threading arm in the tape drive grasps the leader block to extract the magnetic tape through the opening in the one corner of the magnetic tape cartridge and transport the leader block (with its attached magnetic tape) along a tape threading path to be inserted into the takeup reel of the tape drive. The external dimensions and architecture of the 3480-type magnetic tape cartridge are an industry standard, as is the tape threading arm leader block pin that is used to grasp the leader block. The leader block illustrated in FIGS. 1-5 interfaces to equivalent elements and details of the magnetic tape cartridge and tape threading arm leader block pin are omitted for the sake of brevity.

Figure 1:
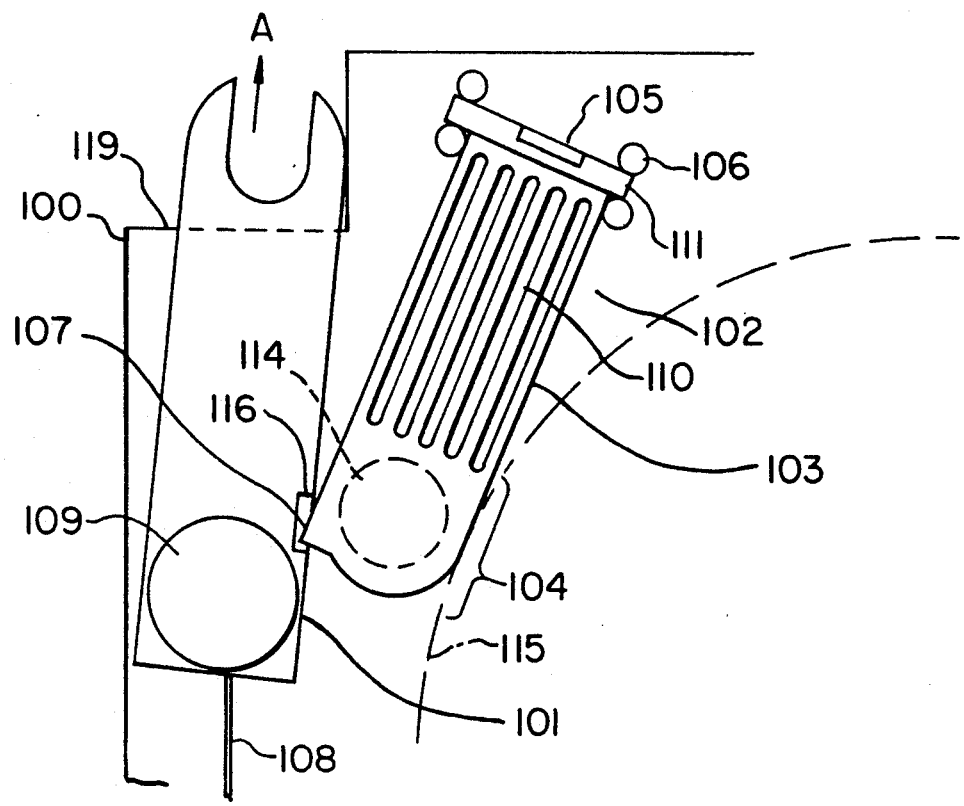
FIG. 1 illustrates a top view of the magnetic tape cartridge including the leader block latch mechanism.

As shown in FIG. 1, the leader block 101 in the magnetic tape cartridge 100 is withdrawn into the opening 121 at the corner of the magnetic tape cartridge 100 by the rewind action of the tape drive (not shown) which rewinds the magnetic tape 108 on the reel 115 contained within the magnetic tape cartridge 100. A stop mechanism (not shown) is provided in the magnetic tape cartridge 100 in order to prevent the leader block 101 from being fully retracted within the housing 117. Therefore, in a rewind operation, the magnetic tape 108 is wound a sufficient distance to snugly place the leader block 101 up against the leader block stop (not shown) within the cartridge housing 117. The stop mechanism is provided in a location that leaves the end of the leader block 101 protruding from the opening 119 a sufficient distance so that the tape threading arm leader block pin can be inserted into the slot contained in the exposed end of leader block 101.

A difficulty with this arrangement is that if the tape drive does not adequately rewind the magnetic tape 108 into the magnetic tape cartridge 100, the leader block 101 is not fully withdrawn to its resting place in the opening 119 in the magnetic tape cartridge 100. Excessive exposure of the leader block 101 leaves it susceptible to being inadvertently withdrawn from the magnetic tape cartridge 100 if the leader block 101 should be snagged on a protruding object during the transportation of magnetic tape cartridge 100 from one location to another. The section of magnetic tape 108 exposed by this action is then susceptible to contamination, which interferes with the ability of the tape drive to accurately read and write data thereon or the magnetic tape 108 can suffer physical damage such as tearing. There presently exists no mechanism for securely locking the leader block 101 in its seated position within the magnetic tape cartridge 100.

Leader Block Latch Mechanism

Figure 5:
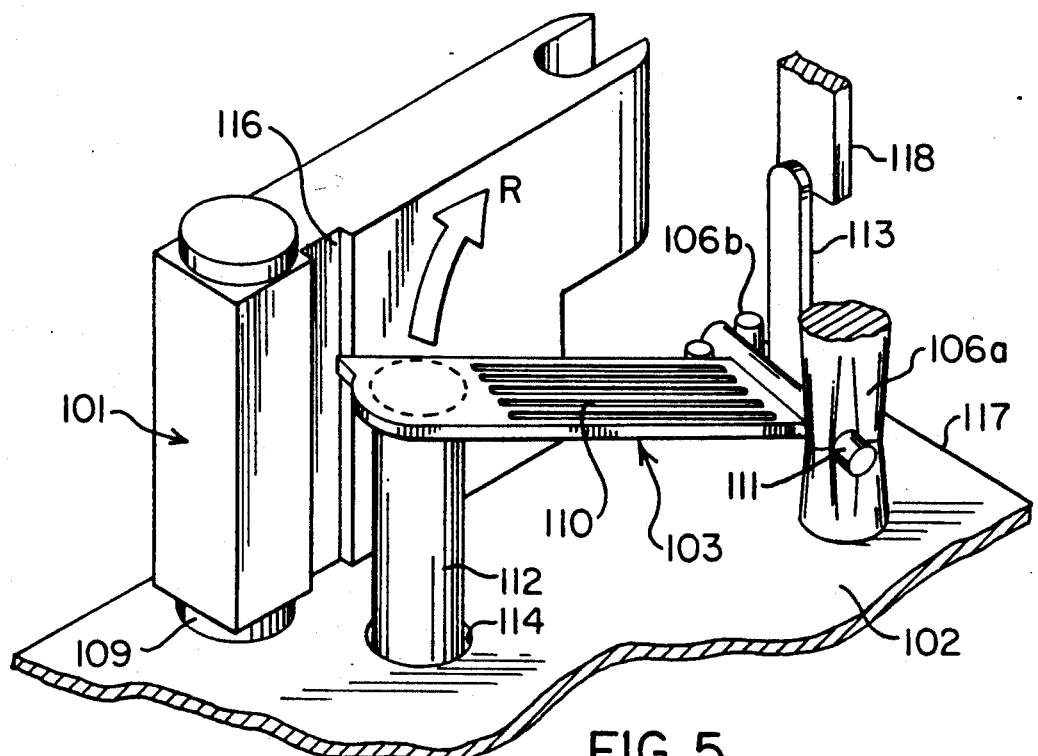

FIG. 1 illustrates a top view of the leader block latch mechanism 102 installed within the improved magnetic tape cartridge 100 of the present invention while FIGS. 2, 4 and 3, 5 illustrate end and perspective views of the same mechanism in its operated and non-operated positions, respectively. In particular, the leader block latch mechanism 102 consists of a latch arm 103 that is pivotally connected at one end 105 to the housing 117 of the magnetic tape cartridge 100 by an appropriate pivot mechanism 106a, 106b, 111. The pivot mechanism 106a, 106b, 111 includes a socket consisting of pivot pin cradle 106b and a support 106a to securely affix this mechanism to the magnetic tape cartridge housing 117 as well as precisely position it therein. A pivot pin 111 is included in the one end 105 of latch arm 103 and rests in the socket with one end being placed in pivot pin cradle 106b and a second end placed into an opening in support 106a. This pivot arrangement enables latch arm 103 to rotate in direction R as shown in FIG. 5.

Latch Spring

Attached to latch arm 103 is a spring 113 that interconnects the latch arm 103 of the latch mechanism 102 to a stop 118 attached to the housing 117. Spring 113 is shown as a flexible member attached to latch arm 103 in a "living hinge" configuration. The spring mechanism used in this apparatus could also be a torsion spring wound coaxially on the pivot pin or any other similar mechanism that performs the function of placing the latch arm 103 in a first position (FIGS. 1, 2, 4) as a result of the application of a force to the latch arm 103 by the spring 113. This first position is the leader block locked position illustrated in FIGS. 1, 2 and 4.

In this first position, the latch arm 103 is located to prevent the withdrawal of the leader block 101 from the magnetic tape cartridge housing 117. This is accomplished by the use of a projection 107 at the end of the latch arm 103 that engages a corresponding feature 116 on the leader block 101 which, in this case, is a substantially rectangular shaped notch in leader block 101, but could also be the docking pin incorporated in the leader block 101. The geometry and dimensions of feature 116 are a matter of design choice and a semi-cylindrical or V-shaped notch could be used. Due to the wide variety of possible embodiments, the term "feature" 116 is used herein to indicate the structure on leader block 101 used to accept first end 104 of the latch arm 103. If the user or a tape drive were to attempt to withdraw the leader block 101 from the magnetic tape cartridge 100, the forward motion (direction A) of the leader block 101 would be arrested by the latch arm 103 encountering feature 116 to prevent any motion of the leader block 101 in direction A. Therefore, the leader block 101 is captured between the latch arm 103 and the docking stop wherein the docking pin 109 and feature 116 prevent the leader block 101 from moving in either of its normal operational directions (+A, −A). Spring 113 maintains latch arm 103 in this locked position absent the application of any exterior force in order to always provide a leader block lock function to safeguard the integrity of the magnetic tape 108 contained within the magnetic tape cartridge 100.

Release of Leader Block Latch Mechanism

Figure 3:
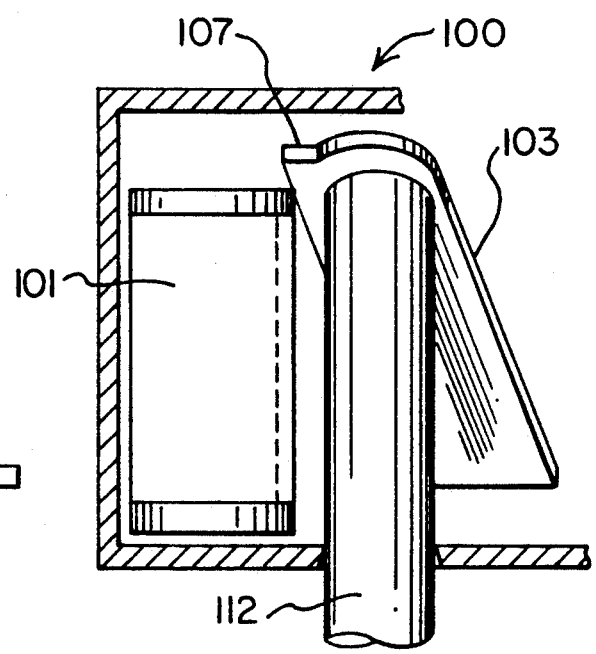

The latch mechanism 102 is shifted to its second position, illustrated in FIGS. 3 and 5, by the application of an external force to latch arm 103 to overcome the force applied thereon by the spring 113. This force is generally applied to latch arm 103 through the insertion of a leader block latch release pin 112 through an aperture 114 in the bottom of the magnetic tape cartridge housing 117 to rotate the latch arm 103 in a vertical direction (R) about pivot pin 111, such that the end 104 of the latch arm 103 clears feature 116 on the leader block 101 to enable a user or a tape drive to extract the leader block 101 from within the magnetic tape cartridge housing 117.

This latch release pin 112 is typically part of the tape drive mechanism and is positioned adjacent to the drive hub on which the magnetic tape cartridge 100 is placed by the tape drive mechanism. Therefore, as the magnetic tape cartridge 100 is loaded onto the drive hub by the user or by an appropriate elevator mechanism contained within the tape drive, the latch release pin 112 contained in this tape drive mechanism enters aperture 114 in the bottom of the magnetic tape cartridge housing 117 and encounters latch arm 103 which locks the leader block 101 in its locked position. As the magnetic tape cartridge 100 is lowered further on the drive hub, this latch release pin 112 forces the latch arm 103 to rotate about pivot pin 111 in a vertical direction (R) a sufficient distance to enable the projection 107 on the end 104 of the latch arm 103 to clear feature 116 contained on the leader block 101 to free the leader block 101 to be withdrawn from the magnetic tape cartridge housing 117.

This latch release pin 112 and guide aperture 114 combination also functions to precisely align the magnetic tape cartridge 100 on the drive hub in a manner that places the leader block 101 in precise alignment with the tape threading arm. This is an important consideration since various magnetic tape cartridges 100 have different lengths of magnetic tape 108 contained therein and it is important to align the leader block 101 with the tape threading arm in a manner that the tape threading arm withdraws the magnetic tape 108 from the magnetic tape cartridge 100 in a direction that is substantially tangential to the reel 115 on which the magnetic tape 108 is wound. Therefore, the guide aperture 114 contained in the magnetic tape cartridge 100 functions to enable the interconnection of the tape drive latch release pin 112 with the latch mechanism 102 contained within the magnetic tape cartridge 100. The edges of this guide aperture 114 that are facing the exterior of the magnetic tape cartridge housing 117 can be tapered to provide a funneling capability to assist in guiding the latch release pin 112 of the tape drive into the guide aperture 114.

In addition, latch release pin 112 is cylindrical in shape and can be rotatably attached to the tape drive. Latch release pin 112 is positioned to function as a guide to align magnetic tape 108 with opening 119 such that magnetic tape 108 does not encounter the sides of opening 119, thereby reducing mechanical wear on magnetic tape 108. Thus, magnetic tape 108 unwinds from reel 115 over latch release pin 112 and exits magnetic tape cartridge 100 via opening 119.

Relocking the Leader Block Latch Mechanism

Figure 2:
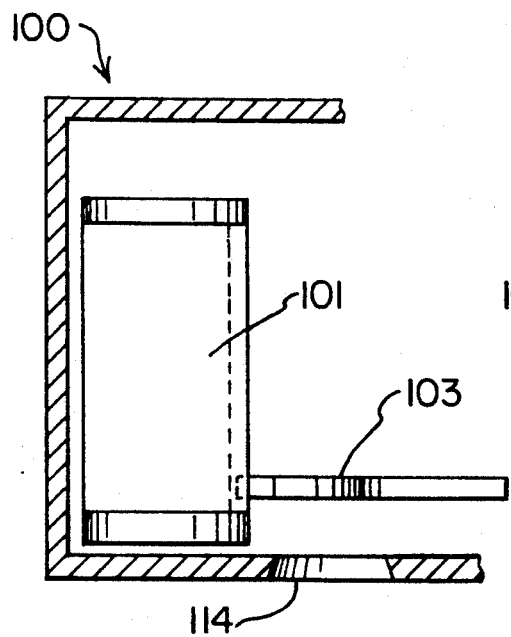
FIGS. 2-5 illustrate end and perspective views of the leader block latch mechanism and additional details of the operation of the leader block latch mechanism.
Figure 4:
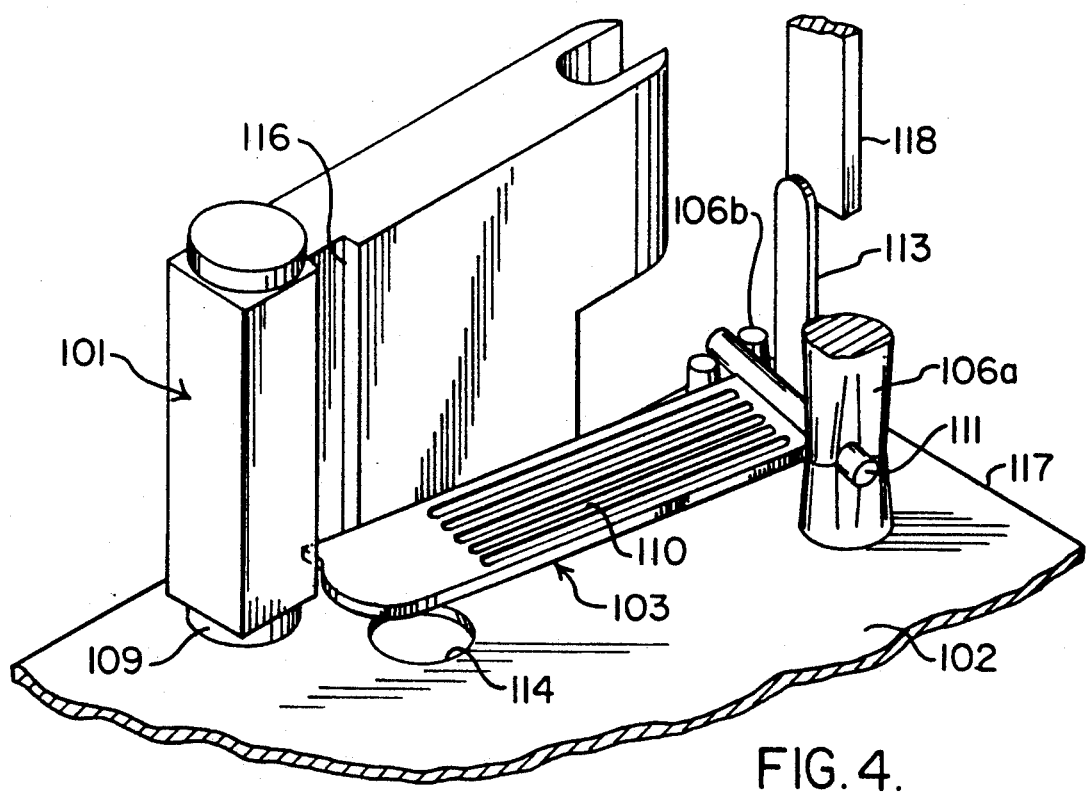

When the tape drive has finished reading and writing data on magnetic tape 108, the tape drive rewinds magnetic tape 108 onto the reel 115 contained within the magnetic tape cartridge 100, thereby seating the leader block 101 in the opening 119 magnetic tape cartridge 100. As the tape elevator of the tape drive lifts the magnetic tape cartridge 100 off the drive hub of the tape drive, the vertical movement of the magnetic tape cartridge 100 causes the withdrawal of the latch release pin 112 from the guide aperture 114 and the spring 113 moves the latch arm 103 from the unlocked position (FIGS. 3, 5) to the locked position (FIGS. 1 2, 4). Thus, by the time the magnetic tape cartridge 100 is released from the drive hub and ejected from the tape drive, the latch arm 103 has been activated by spring 113 and latch arm 103 securely holds leader block 101 in position within the opening 119 in magnetic tape cartridge 100. The user does not have to take any active steps in order to enable or disable the leader block latch mechanism 102 since this is automatically accomplished by use of the latch release pin 112 contained within the tape drive on which the magnetic tape cartridge 100 is placed. This configuration eliminates the possibility of a user failing to lock or unlock the leader block latch mechanism 102 and thereby causing damage to the magnetic tape cartridge 100 or the associated tape drive.

Latch arm 103 also includes a second spring mechanism comprising serrated structure 110. The implementation of serrated structure 110 consists of a plurality of parallel oriented, spaced apart openings extending lengthwise on latch arm 103. Serrated structure 110 enables latch arm 103 to flex in the plane of the reel 115 when latch arm 103 is in the locked position. Thus, if leader block 101 is not seated within magnetic tape cartridge 100 and magnetic tape cartridge 100 is not mounted on a tape drive, the latch mechanism 102 is in the locked position as shown in FIGS. 1, 2, 4 but the leader block 101 is not in place. A user can push leader block 101 into opening 119 of magnetic tape cartridge 100 and serrated structure 110 enables latch arm 103 to bend in a direction coplanar with reel 115 to enable leader block 101 to clear first end 104 of latch arm 103 until leader block 101 is in the position illustrated in FIG. 1, where projection 107 engages feature 116.

While a specific embodiment of this invention has been disclosed, it is expected that those skilled in the art can and will design alternate embodiments of this invention that fall within the scope of the appended claims.

We claim:

1. An improved magnetic tape cartridge, comprising:
 a substantially rectangular housing, which housing has an opening in one corner thereof and is adapted to enclose a single reel of magnetic tape rotatably mounted within said housing and including a leader block attached to one end of said magnetic tape; and
 leader block latch means located within said housing and operable to prevent the extraction of said leader block from said magnetic tape cartridge, comprising:
 latch arm means pivotally connected to said housing and having a first end operable into a first position to block the movement of said leader block through said opening in said housing, and
 spring means connected to said latch arm means for biasing said latch arm means into said first position wherein said first end of said latch arm means to block the movement of said leader block through said opening in said housing.

2. The magnetic tape cartridge of claim 1 wherein said latch arm means has a second end, distal from said first end, said leader block latch means further comprises:
 socket means for receiving said pivot pin means to enable said latch arm means to rotate about said pivot pin means.

3. The magnetic tape cartridge of claim 1 wherein said leader block latch means further comprises:
 an aperture in said housing adapted to receive a leader block latch release pin located on said tape drive, wherein said aperture is located proximate to said latch arm means to enable said leader block latch release pin, as said magnetic tape cartridge is loaded into said tape drive, to overcome said spring means bias on said latch arm means to rotate said latch arm means to a second position wherein said first end of said latch arm means fails to block the movement of said leader block through said opening in said magnetic tape cartridge.

4. The magnetic tape cartridge of claim 3 wherein said aperture is located juxtaposed to said first end of said latch arm means when said first end of said latch arm means is positioned to block the movement of said leader block through said opening in said housing.

5. The magnetic tape cartridge of claim 4 wherein said first end of said latch arm means seals said aperture when said latch arm means is in said first position.

6. The magnetic tape cartridge of claim 3 wherein said aperture is located to enable said latch release pin to function as a guide for said magnetic tape as said magnetic tape is unwound from said single reel, over said latch release pin and out said opening in said magnetic tape cartridge.

7. The magnetic tape cartridge of claim 1 wherein said latch arm means is flexible in a direction coplanar to via single reel to enable said leader block to be inserted into said opening in said magnetic tape cartridge when said latch arm means is in said first position.

8. The magnetic tape cartridge of claim 1 wherein said first end of said latch arm means includes a projection adapted to engage a feature on said leader block to block the movement of said leader block through said opening in said housing.

9. The magnetic tape cartridge of claim 8 wherein said feature comprises a notch inscribed into a surface of said leader block for mating with said projection on said latch arm means.

10. The magnetic tape cartridge of claim 8 wherein said feature comprises a substantially rectangular shaped notch inscribed into a surface of said leader block, extending substantially from the top to the bottom of said leader block, for mating with said projection on said latch arm means.

11. An improved magnetic tape cartridge, comprising:
a substantially rectangular housing, which housing has an opening in one corner thereof and is adapted to enclose a single reel of magnetic tape rotatably mounted within said housing and including a leader block attached to one end of said magnetic tape; and
latch arm means located within said housing, having a first end operable into a first position to block the movement of said leader block through said opening in said housing and having a second end, said second end including pivot pin means; and
socket means for receiving said pivot pin means to enable said latch arm means to rotate about said pivot pin means to optionally block the movement of said leader block through said opening in said housing.

12. The magnetic tape cartridge of claim 11 further comprising:
spring means connected to said latch arm means for biasing said latch arm means into said first position wherein said first end of said latch arm means to block the movement of said leader block through said opening in said housing.

13. The magnetic tape cartridge of claim 14 further comprising:
an aperture in said housing adapted to receive a leader block latch release pin located on said tape drive, wherein said aperture is located proximate to said latch arm means to enable said leader block latch release pin, as said magnetic tape cartridge is loaded into said tape drive, to overcome said spring means bias on said latch arm means to rotate said latch arm means to a second position wherein said first end of said latch arm means fails to block the movement of said leader block through said opening in said magnetic tape cartridge.

14. The magnetic tape cartridge of claim 13 wherein said aperture is located juxtaposed to said first end of said latch arm means when said first end of said latch arm means is positioned to block the movement of said leader block through said opening in said housing.

15. The magnetic tape cartridge of claim 14 wherein said first end of said latch arm means seals said aperture when said latch arm means is in said first position.

16. The magnetic tape cartridge of claim 13 wherein said aperture is located to enable said latch release pin to function as a guide for said magnetic tape as said magnetic tape is unwound from said single reel, over said latch release pin and out said opening in said magnetic tape cartridge.

17. The magnetic tape cartridge of claim 14 wherein said latch arm means is flexible in a direction coplanar to said single reel to enable said leader block to be inserted into said opening in said magnetic tape cartridge when said latch arm means is in said first position.

18. The magnetic tape cartridge of claim 10 wherein said first end of said latch arm means includes a projection adapted to engage a feature on said leader block to block the movement of said leader block through said opening in said housing.

19. The magnetic tape cartridge of claim 18 wherein said feature comprises a notch inscribed into a surface of said leader block for mating with said projection on said latch arm means.

20. The magnetic tape cartridge of claim 8 wherein said feature comprises a substantially rectangular shaped notch inscribed into a surface of said leader block extending substantially from the top to the bottom of said leader block, for mating with said projection on said latch arm means.

* * * * *